Figure 5:
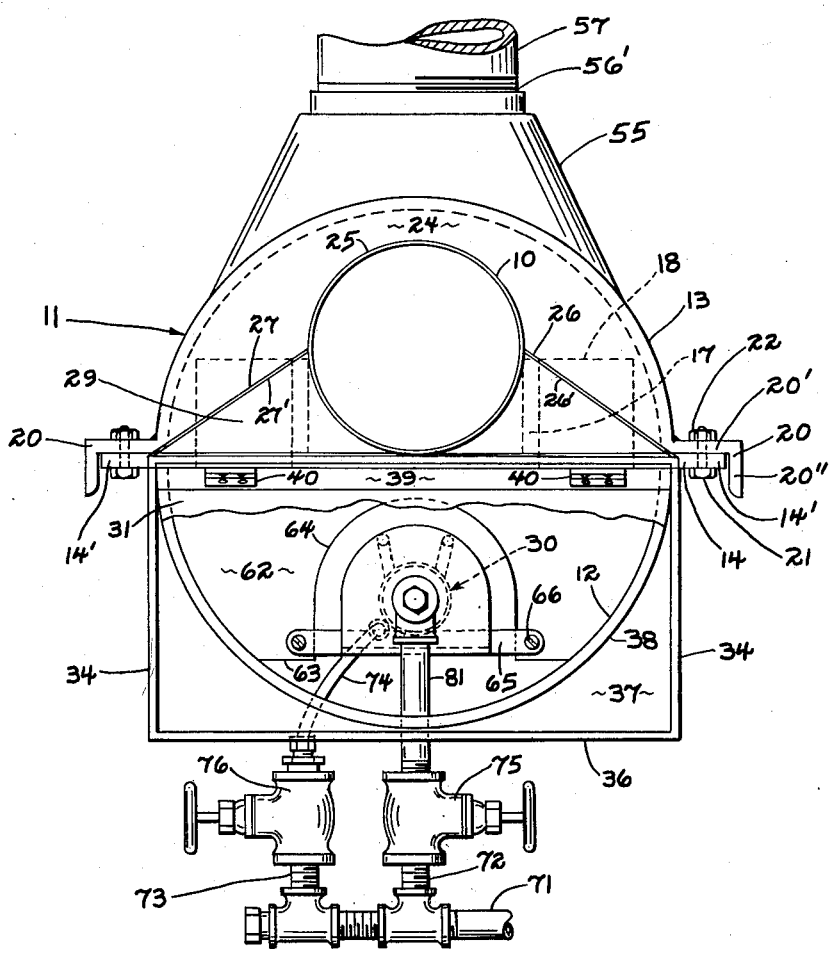

Nov. 18, 1952     W. O. MORAN     2,618,293
PIPE LINE HEATER
Filed July 31, 1950     3 Sheets-Sheet 1
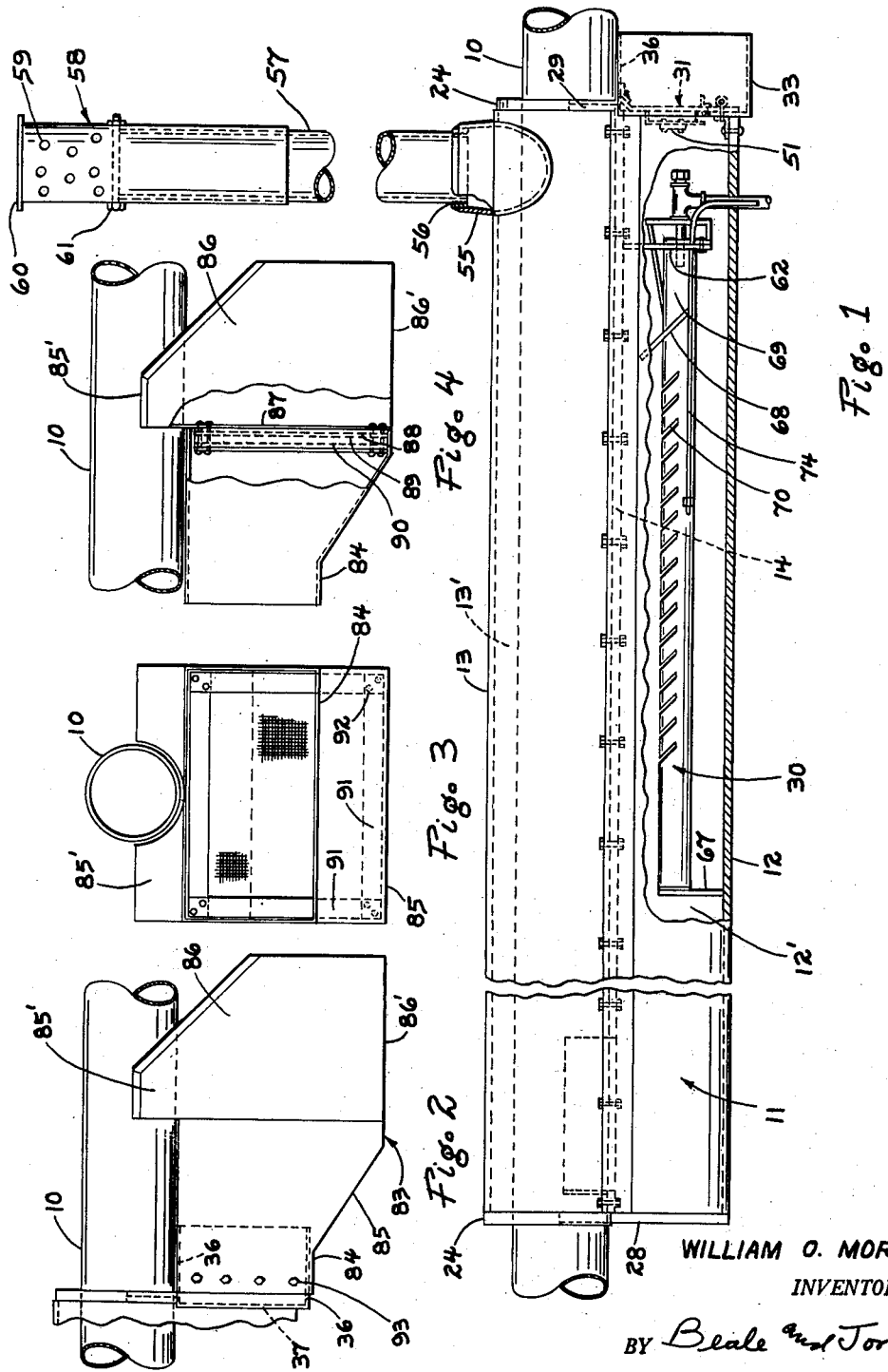
WILLIAM O. MORAN
INVENTOR.
BY Beale and Jones
Attorneys

WILLIAM O. MORAN
INVENTOR.

BY Beale and Jones

Attorneys

Nov. 18, 1952 — W. O. MORAN — 2,618,293
PIPE LINE HEATER
Filed July 31, 1950 — 3 Sheets-Sheet 3

WILLIAM O. MORAN
INVENTOR.

BY Beale and Jones

Attorneys

Patented Nov. 18, 1952

2,618,293

UNITED STATES PATENT OFFICE 2,618,293

PIPE LINE HEATER

William O. Moran, Tulsa, Okla.

Application July 31, 1950, Serial No. 176,815

2 Claims. (Cl. 138—32)

My invention is directed to a heater for a pipe line containing fluid.

While the heater according to my invention is particularily useful in heating exposed pipe lines carrying fluid and gas in oil production fields, oil refineries, tank farms and the like, it is also of general use for heating a pipe containing fluid.

It is an object of my invention to provide a heater that may be easily assembled over an already installed section of a pipe in a pipe line.

Another object of my invention is to provide a pipe line heater which consists of an elongated housing that may be assembled about a section of pipe with the housing having two portions separated by an elongated baffle which is apertured to provide communication between the two portions, one of which portions contains the section of pipe to be heated while the other portion contains a heating means for supplying heat which passes from the heating means portion through the apertures in the baffle to and through the other portion of the housing containing the pipe and thence is exhausted through a suitable aperture in the housing.

It is a further object of my invention to provide a pipe line heater consisting of a two part elongated housing which is separated by a baffle having an aperture therethrough toward one end with one part of the housing provided with a fluid fuel burner and an opening through one end of that part of the housing while the other part of the housing is adapted to surround an elongated pipe section to be heated and is provided with an exhaust opening so that heat produced by the burner passes through the elongated part of the housing containing the heater, through the aperture in one end of the baffle, thence in a reverse direction through the elongated part of the housing encompassing the section of pipe and then out through the exhaust aperture in the housing which is at an end of the housing opposite to that of the apertured baffle.

It is still a further object of my invention to provide in a pipe line heater comprising a two part housing one of which contains a fluid fuel heater and the other of which parts contains a section of pipe line to be heated, a flash arresting device for the fluid fuel heater and a draft equalizer for an exhaust flue connected with the pipe line containing part of the housing.

Still further objects and the entire scope of applicability of the present invention will become apparent from the detailed description given hereinafter; it should be understood, however, that the detailed description and specific examples are given by way of illustration only and, while indicating preferred embodiments of the invention, are not given by way of limitation, since various changes and modifications within the spirit and scope of the invention will become apparent to those skilled in the art from this detailed description.

Figure 6:
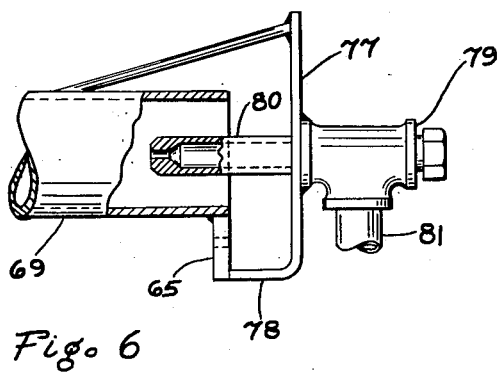
Figure 7:
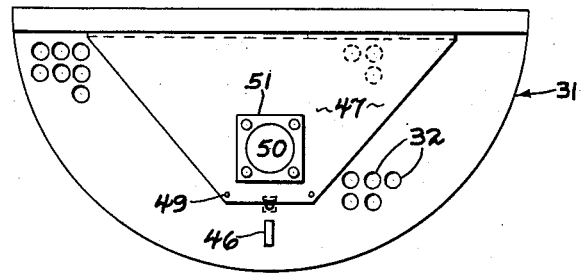
Figure 8:
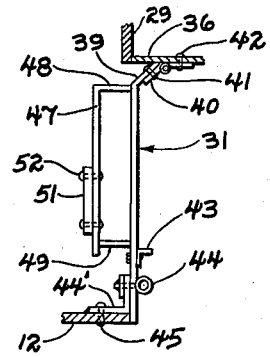
Figure 9:
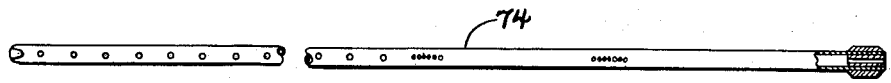

In the accompanying drawings Figure 1 is a side elevation of the heater shown mounted on a section of pipe line to be heated with the lower portion of the heater housing broken away to show the fluid fuel heater; Figure 2 is a side elevation of the right hand end of the heater and pipe line of Figure 1 but depicting a flash arrester and its housing mounted on my heater; Figure 3 is an end view looking into the left hand end of the flash arrester shown in Figure 4; Figure 4 is a side view of the flash arrester as shown in Figure 2 but with a portion of its housing wall broken away so as to illustrate the mounting of the flash arrester screening elements; Figure 5 is an end view of the right hand end of the heater shown in Figure 1 with the door broken away to show the mounting for the end of the burner and with the addition of the fluid fuel supply line and cut off valves therein for the fluid fuel heater and lighter tube; Figure 6 is a detail view partially in section of the fuel supply line end of the burner; Figure 7 is a view of the door of the heater as viewed from inside the heater, or as seen from the left of Figure 8; Figure 8 is a side elevation of the door of the heater showing its mounting; Figure 9 is a top plan view of the lighter tube; and Figure 10 is a plan view of the elongated baffle which separates the two halves of the pipe line heater housing.

Throughout the various figures of the drawings like reference numerals refer to similar parts.

In Figure 1 I have shown the general arrangement of my pipe line heater. A section of pipe line containing fluid to be heated is indicated at 10, such as pipe line carrying gas or petroleum oils of relatively high viscosity in oils fields which may be exposed to cold weather temperatures. The transmission of such gas and oils is made practical in view of my heater even in extreme low temperatures. The pipe line heater is generally indicated at 11 and comprises an elongated housing having a lower semi-cylindrical section or half 12 which I designate as the heater means containing portion and an upper semi-cylindrical half or section 13 which is designated the elongated pipe containing portion. This elongated housing 11 may be of various shapes and I have shown the preferred form as being an elongated cylindrical housing.

Figure 10:
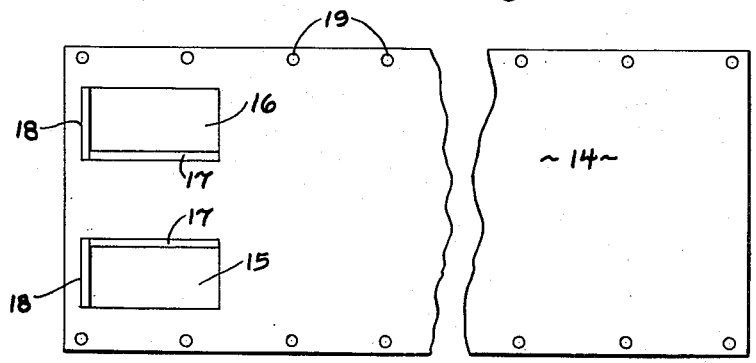

In Figure 10 there is shown an elongated baffle plate 14 which in the assembled heater separates the lower half 12 from the upper half 13. Toward one end of the baffle plate 14 there are cut out portions 15 and 16 forming apertures which provide for communication from the heater means containing portion 12' to the pipe to be heated containing portion 13'. These apertures 15 and 16 are shown as rectangular in shape and are disposed at one end and toward each side of the baffle. In constructing the baffle plate 14 there is secured to its upper surface along the inboard edges of the apertures 15 and 16 vertically extending guide plates 17 and along the ends of the apertures nearest the end of the baffle reinforcing or guide plates 18, the purpose of which will be presently set forth.

Referring to Figures 1 and 5, there is shown the assembly of the heater housing 11. The elongated baffle 14 is welded or otherwise fixed to the open half of elongated semi-cylindrical lower half 12 and extends beyond the edges of member 12 as flanged portions 14' which are provided with a plurality of spaced bolt receiving apertures 19 as best shown in Figure 10. The upper semi-cylindrical half 13 has secured thereto along the edges of its open side, angle iron members 20 in such a manner that one of the flanges of the angle iron extends horizontally to fit over the flanged edges 14' on baffle 14 while the other flange 20'' thereon depends in a vertical direction over the extreme outer edges of the flange portions 14' of the baffle 14. The flange portion 20' of the angle irons 20 are likewise apertured with a plurality of spaced apertures so as to be in alignment with apertures 19 along each flange edge of baffle 14 in such a manner as to receive securing bolts 21 which have cooperating nuts 22 to tightly draw the two semi-cylindrical halves 12 and 13 together.

In assembling the heater, the upstanding guide plates 17 along the inner edges of the apertures 15 and 16 of baffle 14 along their upper inner surfaces abut against the pipe line section 10 as best shown in Figure 5 in broken lines. These upwardly extending guides 17 and 18 also provide a flue like passage way with the apertures 15 and 16 in the baffle for conducting and directing the heated air and combustion gases from the heat producing portion 12' to the pipe to be heated portion 13' in the heater.

Referring again to Figures 1 and 5 the closures at each end of the heater housing 11 will be described. In order to assemble the heater about an already installed section of pipe line, it is made in two sections 12 and 13 which are bolted together as described above. Each end of the upper half section 13 has secured thereto, as by welding, a transversely extending upper end plate 24 which is formed at its central portion with a lower marginal edge at 25 of semi-circular shape to fit over the upper half of pipe 10 while the marginal edge to each side of semicircular edge 25 is defined by downwardly and outwardly extending straight edges 26 and 27. The baffled aperture end or the forward end of the heater has the balance of its end closed by a plate 28 which is welded to the end of lower section 12 and has an upper edge which is shaped complementary to the lower edge of plate 24 so as to completely enclose the forward end of the housing. In Figure 5 it will be noted that end plate 24 is thicker than its complementary lower plate 28. In the construction illustrated, the upper plate 24 is of ¾'' thick steel stock while the lower plate 28 is of stock ½'' thick.

Referring to the right hand end of Figure 1 which is the rear end of the heater 11, the balance of the end of the heater is enclosed by a plate 29 whose lower edge is straight and extends as a diameter of the end of housing 11 where it is welded to the adjacent upper surface of the rear end of baffle plate 14. The upper edge of end plate 29 has its central portion in the form of a semicircle to fit about the adjacent lower half of pipe section 10 while the edge portions to each side thereof, as indicated at 26' and 27', extend downwardly and outwardly and abut the lower respective edges 26 and 27 of plate 24. As in the forward end closure construction, plate 24 is ¾'' stock while plate 29 is of ½'' stock. The rear end of lower section 12 or the end opposite to the baffle apertured end of the housing 11 is apertured to provide for the admission of air to be heated and to support combustion in the liquid fuel burner generally indicated at 30 in the heater means containing portion 12' of the heater 11. This apertured rear end of section 12 is provided with a door generally indicated at 31 which is perforated with a plurality of apertures 32 as shown in Figure 7, however, only a few are shown by way of illustration. Surrounding and attached to the rear or door end of section 12 is a rectangular shaped box like housing 33 open at each end and built up of metal sheets 34—34 on each side and 36—36 on the top and bottom while the forward end 37 comprises a sheet of metal stock having a semi-circular edge 38 which is of the same size as the end of semi-cylindrical section 12 to which it is fixed as by welding.

As to the construction and mounting of the door 31 for the heater portion 12' of the housing 11 reference may be had to Figures 7 and 8. Door 31 is of semi-circular shape as shown to fit into the semi-circular apertured end of lower section 12 and may be fabricated from 16 gauge black iron. The upper edge portion 39 is bent inwardly as best shown in Figure 8 at about a 45 degree angle and has attached a pair of hinges 40 as by rivets 41 which are in turn fixed to the lower adjacent face of top member 36 of housing 33 by means of rivets 42. A small piece of angle iron 43 is riveted to the outer face of door 31 to form a means for grasping the door to swing it open and closed. A latch for the door 31 consists of an eye bolt 44 which is pivotally secured to an angle iron clip 44' riveted to the adjacent inner surface of the rear end of section 12 by a rivet 45. The pivoted eye bolt 44 is spaced from clip mounting 44' so as to be received by a slot 46 in the door 31 as shown in Figure 7.

Still referring to the construction of the door 31 there is affixed in spaced relationship to its inner face a baffle 47 which has an angular formed upper flange 48 welded to door 31 while the lower corners of this somewhat triangular shaped baffle 47, see Figure 7, are supported by two studs 49. This baffle member 47 is apertured at 50, as shown in Figure 7, which aperture is substantially in alignment with the axis of the fluid fuel burner 30 shown in Figure 1 so as to provide a "peep hole" to inspect the condition of the flame in the fluid fuel burner without opening the door 31. A suitable transparent plate 51 of material such as Plexiglas is secured by means of rivets 52 to the door 31 to cover the aperture 50.

An exhaust flue housing mounting is generally shown at 55 in Figures 1 and 5 which covers an aperture in the top of the upper section 13 of the housing 11 at the rear end or the end opposite to the baffle apertured end of the housing 11. This exhaust flue housing mounting 55 is provided with internal threads at 56 for receiving a cylindrical exhaust stack or flue 57 having a threaded lower end 56' as best shown in Figure 5. Mounted on top of the exhaust stack 57 is a draft equalizer 58 of the character as described in my copending application Serial Number 54,451, filed October 14, 1948. This draft equalizer cap 58 is provided with a plurality of spaced apertures 59 having a total area equal to the cross sectional area of the flue or stack 57. The draft equalizer 58 is provided with an imperforate top 60 and is secured on the top of flue or stack 57 by means of a through bolt 61.

The fluid fuel burner 30 may be of a type also disclosed in my copending application Serial Number 54,451, filed October 14, 1948. The fluid fuel burner here disclosed is mounted at its rear end by means of a mounting plate 62 which is fixed to the lower surface of baffle 14, as by welding, in a depending manner. In Figure 5 there is shown this mounting plate 62 having a lower horizontally disposed edge 63 with the intermediate or central portion defined by an arcuate edge 64 which defines a cut out in the lower portion of the plate for receiving the burner 30. Burner 30 is provided with a transversely extending mounting bracket 65 which is apertured at its extreme ends to receive mounting bolts 66 which secure the rear end of the burner to the mounting plate 62. The forward end of the burner 30 is supported by a depending post 67 fixed thereto whose lower end rests against the adjacent interior surface of lower section 12 of housing 11. This burner 30 is mounted in the heat producing means portion 12' toward the rear end thereof or toward the end opposite to the apertured baffle end of the housing 11.

Affixed to the burner 30, I have shown a forwardly inclined baffle 68 which projects about the burner barrel 69 and is inclined forwardly at about a 45 degree angle. This baffle assists in preventing draft directly along the upper edges of the burner slots 70 from a rearwardly direction and assists in preventing the extinguishment of the burner flames by such drafts.

The fuel supply line to the burner 30 is shown at 71 in Figure 5 and branch leads 72 to the burner proper and 73 to the lighter tube 74 are shown with suitable cut off or regulating hand valve 75 for the burner proper and a similar value 76 for the lighter tube 74.

In Figure 6 there is shown a detailed view of the right hand end of the burner comprising the barrel 69, the spaced rear baffle 77 having an inturned lower flange 78 to which is welded the mounting bracket or strap 65. A T-shaped coupling 79 is fixed to the baffle 77 as by welding and leading from coupling 77 is a nozzle 80 which extends through a suitable aperture in baffle 77. A nipple coupling 81 connects coupling 79 with shut off or regulating valve 75.

Referring now to Figure 2, I have shown the attachment of a flash arrester housing generally indicated at 83 which fits over the box like structure 33 on the right hand end of the pipe line heater shown in Figure 1. This flash arrester is of the type disclosed in my prior application Serial No. 54,451, filed October 14, 1948. The forward end of the housing 83 is provided with a suitable adapter 84 which is fabricated from sheet steel stock with four sides to slidably fit over the open ended box-like structure 33 on the rear end of the lower section 12 of the heater as described previously. The adapter 84 gradually enlarges in cross sectional area as indicated generally at throat portion 85. The rear of the flash arrester housing indicated at 86 is of square cross section and is provided with an upper portion 85' which fits about each side of pipe line section 10, as best illustrated in Figure 3 which is a view into the left hand of the structure of Figure 4. The rear section 86 of the flash arrester 83 is fabricated with inturned flanges 87 at its forward end as shown in the broken away section of the housing in Figure 4.

Attached to these inturned flanges 87 are flash arrester screens, 88 and 89 which are at the rear end and are spaced apart a relative short distance while leading or forward screen 90 is spaced apart from screen 89 greater than the spacing between screens 88 and 89. These screens are fully described in my copending application Serial No. 54,451, filed October 14, 1948. Suitable retaining strips 91 secured to the inturned flanges 87 by rivets 92 serve to hold in place the screen sections 88, 89, and 90.

In the construction and operation of the flash arrester 83, suitable securing bolts 93 hold it secure in place on the box-like housing 33 attached to the door aperture of the heater housing 11. The flash arrester is open at the bottom of its rear housing 86 as indicated at 86' so as to permit air to enter through the flash arrester housing yet not be affected by blasts of air as may blow in a windy area. This air enters through bottom opening 86', thence changes direction by 90 degrees and then passes through the flash arrester screen 88, 89, and 90 on through the apertured door 31 and to the burner area housing burner as indicated at 30 in Figure 1.

In order to light off burner 30, the lighter tube 74 is first lighted. Then valve 75 is opened and burner 30 proper is ignited. The lighter tube 74 should be extinguished and not allowed to burn as a pilot light. Valve 76 permits adjustment of the fluid fuel in the lighter tube 74. A suitable flame from the slotted burner elements 70 may be had by observing it through the "peep hole" 51 and by adjusting the control valve 75 as necessary.

This pipe line heater according to my construction provides a very economical and practical means for heating fluid in exposed pipe line areas so as to keep up the circulation of the fluids in the pipes.

Heat generated by burner 30 in the form of combustion gases and entrained heated air passes along the elongated heat means containing portion 12' along the underneath side of baffle 14 up to the forward or baffle apertured end of the housing 11. The gases then pass through the apertures 15 and 16 at each side of the pipe 10 up into the upper half or pipe containing section 13'. The gases then reverse direction and pass along the surface of pipe 10 as heated gases or gases of combustion, thence pass out of the housing 13 aperture to the exhaust flue where they are exhausted through the draft equalizer 58.

This heater of the substantially two part or section construction is easily assembled about an already installed pipe line section and provides for a maximum amount of heating area or surface. The outer shell or housing is about 16 inches in diameter for a pipe line of 6½ inches in diameter while the length of the heater is about 8½ feet as here illustrated.

These heaters have been found very useful in the Texas Panhandle area on feeder lines in a gathering system. Such feeder lines run from the gas wells to the main trunk line carrying gas to the gasoline plants. As an example of their effectiveness, a regulator on the main line, as referred to above, had been operating satisfactorily and free of ice all winter. About the middle of March, it was necessary to shut a well in on which line one of these heaters was being used. After the well was shut in and no gas was flowing through the line from this well, the regulator on the main line began freezing up. It was necessary to open the well and let enough gas to flow through the line containing one of these heaters to thaw out the regulator. This regulator in the main trunk line was about a mile down the gas stream from this heater and yet its heating effect was adequate to transfer heat to the regulator to thaw it out.

A very admirable feature of this pipe line heater according to my invention is its safety feature. The burner is protected from excessive drafts which might extinguish the flame in the burner through the draft equalizer 58 on the stack 57 and by the baffling for entering air through the flash arrester 83, the apertured door construction 31 and the baffling at the rear end of the burner 30 at best shown in detail in Figure 6 and by the additional diagonal baffle 68, shown in Figure 1. As a safety feature in this heater to prevent flame from back firing out through the door of the heater, I provide the flash arresting screen 90 nearest the burner and then the rearwardly spaced secondary flash arrester screens 88 and 89 which with the screen 90 and the housing prevent flame from reaching the outside where explosive gases might be ignited. The circuitous path leading through the flash arrester to the burner proper also provents high winds which blow in areas where such burners are used from extinguishing the burner flame.

I claim as my invention:

1. A heater for a pipe containing fluid comprising in combination a horizontally extending heater housing having a forward end and a rear end and comprising an upper semi-cylindrical shell having an exhaust opening at its rear end, and adapted to house a section of pipe line to be heated, a lower semi-cylindrical shell, a horizontal baffle plate separating said upper and lower cylindrical shells and being apertured at its forward end to permit passage of gases therethrough, said horizontal baffle being fixed to the upper elongated edges of said lower semi-cylindrical shell and having protruding flange portions extending outward from said edges, said elongated upper semi-cylindrical shell having fixed thereto horizontally outward extending flanges for abutment against said flanges on said lower semi-cylindrical shell, means for securing said flanges tightly together whereby said shells are held together, the forward end of said lower shell having a transversely extending end plate fixed thereto having an upper edge shaped to fit said section of pipe, the rear end of said lower shell having attached thereto a transversely extending end plate which is apertured to permit the passage of air therethrough and having its upper edge shaped to fit said section of pipe, said upper semi-cylindrical shell being provided with transversely extending end plates having edges shaped to fit said section of pipe and cooperating edges on said end plates of the lower shell, an exterior housing attached to said rear end of the lower shell adjacent said apertured end plate, a flash arrester means attached to said exterior housing, an exhaust flue attached to said upper shell and in communication with said exhaust aperture at the rear end thereof and having a draft equalizing means attached to the outer end thereof, and a heat producing means of the fluid fuel type mounted toward the rear end of said lower semi-cylindrical shell whereby exhaust gases from said heat producing means in said lower semi-cylindrical shell pass from the rear end of the shell to the forward end thereof, upward through said aperture in said forward end of the baffle, then in a reverse direction through said semi-cylindrical shell and over said housed section of pipe to the rear end of said upper semi-cylindrical shell and thence out through said exhaust opening and exhaust stack.

2. A heater for a pipe containing fluid comprising in combination a horizontally extending heater housing having a forward end and a rear end and comprising an upper elongated shell having a pair of spaced apart elongated edges providing an open faced bottom thereto, said upper elongated shell having an exhaust opening adjacent its rear end and adapted to house a section of pipe line extending therethrough to be heated, a lower elongated shell having a pair of spaced apart elongated edges providing an open faced top thereto, said lower shell being positioned below said upper shell with the open faced top thereof facing the open faced bottom of said upper shell, a horizontal baffle plate disposed between said upper and lower shells and extending between the elongated edges of the shells thereby closing off the open face bottom of the upper shell and the open faced top of the lower shell, means for attaching said elongated edges of said shells and said baffle plate whereby to form said elongated heater housing, said horizontal baffle being apertured at its forward end to permit passage of gases therethrough from the lower shell to the upper shell, the forward end of said lower elongated shell having a transversely extending end plate fixed thereto having an upper edge shaped to fit said section of pipe, the rear end of said lower shell having attached thereto a transversely extending end plate which is apertured to permit entrance of air into said lower shell of the housing and having its upper edge shaped to fit said section of pipe, said upper semi-cylindrical shell being provided with transversely extending end plates having edges shaped to fit said section of pipe and cooperating edges on said end plates of the lower elongated shell, an exterior housing attached to said rear end of the lower shell adjacent to and communicating with said apertured rear end plate of the lower shell, a flash arrester means attached to said exterior housing, an exhaust flue attached to said upper shell and in communication with said exhaust aperture at the rear end thereof, and a heat producing means of the fluid fuel type mounted toward the rear end of said lower elongated shell, whereby exhaust gases from said heat producing means in said lower elongated shell pass from the rear end of the shell to the forward end thereof, upward through said aperture in said forward end of the baffle, then in a reverse direction through said semi-cylindrical shell and over said housed section of pipe to the rear end of said upper elongated shell and thence out through said exhaust opening and exhaust stack.

WILLIAM O. MORAN.

REFERENCES CITED

The following references are of record in the file of this patent:

UNITED STATES PATENTS

| Number | Name | Date |
|---|---|---|
| 246,231 | Spencer | Aug. 23, 1881 |
| 1,283,125 | Ewers | Oct. 29, 1918 |
| 1,674,531 | Steinle | June 19, 1928 |
| 1,977,672 | Elliott | Oct. 23, 1934 |
| 2,340,389 | Janosky | Feb. 1, 1944 |
| 2,531,139 | Lily et al. | Nov. 21, 1950 |

FOREIGN PATENTS

| Number | Country | Date |
|---|---|---|
| 147,738 | Austria | of 1937 |
| 586,523 | Great Britain | of 1947 |